(12) United States Patent
Oh et al.

(10) Patent No.: US 6,355,742 B1
(45) Date of Patent: Mar. 12, 2002

(54) METHOD OF RECYCLING COCATALYST FOR OLEFIN POLYMERIZATION CONDUCTED WITH METALLOCENE CATALYST

(75) Inventors: Jae-Seung Oh; Bun-Yeoul Lee, both of Taejeon (KR)

(73) Assignee: LG Chemical, Ltd., Seoul (KR)

( * ) Notice: Subject to any disclaimer, the term of this patent is extended or adjusted under 35 U.S.C. 154(b) by 0 days.

(21) Appl. No.: 09/445,667

(22) PCT Filed: Apr. 9, 1999

(86) PCT No.: PCT/KR99/00170

§ 371 Date: Dec. 9, 1999

§ 102(e) Date: Dec. 9, 1999

(87) PCT Pub. No.: WO99/52952

PCT Pub. Date: Oct. 21, 1999

(30) Foreign Application Priority Data

Apr. 9, 1998 (KR) ............................................ 98-12659

(51) Int. Cl.[7] .............................. C08F 2/06; C08F 4/642
(52) U.S. Cl. .......................... 526/69; 526/160; 526/943
(58) Field of Search ............................................ 526/69

(56) References Cited

U.S. PATENT DOCUMENTS

| | | | |
|---|---|---|---|
| 3,939,213 A | 2/1976 | Homeier et al. ............. 260/615 |
| 3,957,697 A | * 5/1976 | Schlatzer ...................... 260/2 A |
| 5,001,221 A | * 3/1991 | Van Broekhoven ......... 528/392 |
| 5,017,714 A | 5/1991 | Welborn, Jr. ................. 556/12 |
| 5,026,798 A | 6/1991 | Canich ......................... 526/127 |
| 5,057,475 A | 10/1991 | Canich et al. ............... 502/104 |
| 5,096,867 A | 3/1992 | Canich ......................... 502/103 |
| 5,120,867 A | 6/1992 | Welborn, Jr. .................. 556/12 |
| 5,126,301 A | 6/1992 | Tsutsui et al. ............... 502/108 |
| 5,145,819 A | 9/1992 | Winter et al. ................ 502/117 |
| 5,202,398 A | 4/1993 | Antberg et al. .............. 526/129 |
| 5,225,501 A | 7/1993 | Fujita et al. ................. 526/127 |
| 5,234,878 A | 8/1993 | Tsutsui et al. ............... 502/103 |
| 5,266,544 A | 11/1993 | Tsutsui et al. ............... 502/113 |
| 5,466,766 A | 11/1995 | Patsidis ....................... 526/129 |
| 5,580,939 A | 12/1996 | Ewen et al. ................. 526/127 |
| 5,633,394 A | 5/1997 | Welborn, Jr. et al. ......... 556/11 |
| 5,658,982 A | 8/1997 | Baardman et al. |
| 5,814,574 A | 9/1998 | McNally ...................... 502/102 |
| 5,824,620 A | 10/1998 | Vega et al. .................. 502/117 |
| 6,143,685 A | 11/2000 | Llinas et al. ................. 526/129 |

FOREIGN PATENT DOCUMENTS

| | | |
|---|---|---|
| EP | 0 293 815 A1 | 12/1999 |
| WO | WO 99/52949 | 10/1999 |

* cited by examiner

Primary Examiner—David W. Wu
Assistant Examiner—R. Rabago
(74) Attorney, Agent, or Firm—Knobbe Martens Olson & Bear LLP

(57) ABSTRACT

A method of recycling a cocatalyst for olefin polymerization conducted with a metallocene catalyst is provided. In the method, olefinic monomers are polymerized using a supported catalyst and cocatalyst. The supported catalyst is prepared by covalent bonding a catalyst with a support and the cocatalyst is dissolved in a suspension. The cocatalyst is separated from the resulting suspension after polymerization, and the separated cocatalyst is reused for subsequent polymerization.

13 Claims, 1 Drawing Sheet

METHOD OF RECYCLING COCATALYST FOR OLEFIN POLYMERIZATION CONDUCTED WITH METALLOCENE CATALYST

CROSS REFERENCE TO RELATED APPLICATION

This application is based on application No. 98-12659 filed in the Korean Industrial Property Office on Apr. 9, 1999, the content of which is incorporated hereinto by reference.

BACKGROUND OF THE INVENTION (a) Field of the Invention

The present invention relates to a method of recycling a cocatalyst for olefin polymerization conducted with a metallocene catalyst, and more particularly, to a method of recycling a cocatalyst for olefin polymerization conducted with a metallocene catalyst which can reuse cocatalyst for subsequent olefin polymerization such that the total amount of cocatalyst required can be reduced.

(b) Description of the Related Art

In 1976, Kaminsky of Germany reported that a metallocene catalyst shows high activity to olefin polymerization when methylaluminoxane is used for a cocatalyst (A. Anderson, et al., J. Herwing, W, Kaminsky, A. Merck, R. Motteweiler, J. Pein, H. Sinn, and H. J. Vollmer, Angew. Chem. Int. Ed. Engl., 15, 630, 1976).

This homogeneous catalyst has unique characteristics that distinguishes it from the conventional Ziegler-Natta catalyst. That is, this metallocene catalyst produces polymers with a narrow molecular weight and comonomer distribution and shows high copolymerization efficiency. Furthermore, by varying the type of ligand of metallocene catalyst, molecular weight or copolymerization degree can be changed, and, according to a molecular symmetry of the catalyst, stereoselectivity of the polymer can be controlled. These characteristics allow this metallocene catalyst can produce new polymers that can not be made with the conventional Ziegler-Natta catalyst. Hence, enormous efforts are being made in the research of this metallocene catalyst.

For activating this metallocene catalyst, however, an excess amount of aluminoxane, which is used for the cocatalyst, is required. Generally, a mole ratio of aluminoxane to metallocene is around 100–40000 to 1. The aluminoxane remains in the resulting polymer so that the physical properties of the resin are deteriorated. Furthermore, because the aluminoxane is very expensive, overall production costs are increased.

SUMMARY OF THE INVENTION

It is an object of the present invention to provide a method of recycling a cocatalyst for olefin polymerization conducted with a metallocene catalyst which can reuse the cocatalyst for subsequent olefin polymerization process such that the total amount of the cocatalyst reqiured can be reduced and production cost is minimized.

These and other objects may be achieved by a method of recycling a cocatalyst for olefin polymerization conducted by using a methallocene catalyst. The method includes the steps of polymerizing olefinic monomers by using a supported catalyst and a cocatalyst, separating the cocatalyst from the resulting polymer, and recycling the separated cocatalyst for subsequent olefinic polymerization. The supported catalyst is prepared by covalent-bonding a catalyst with a support, and the cocatalyst is dissolved in a suspension.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
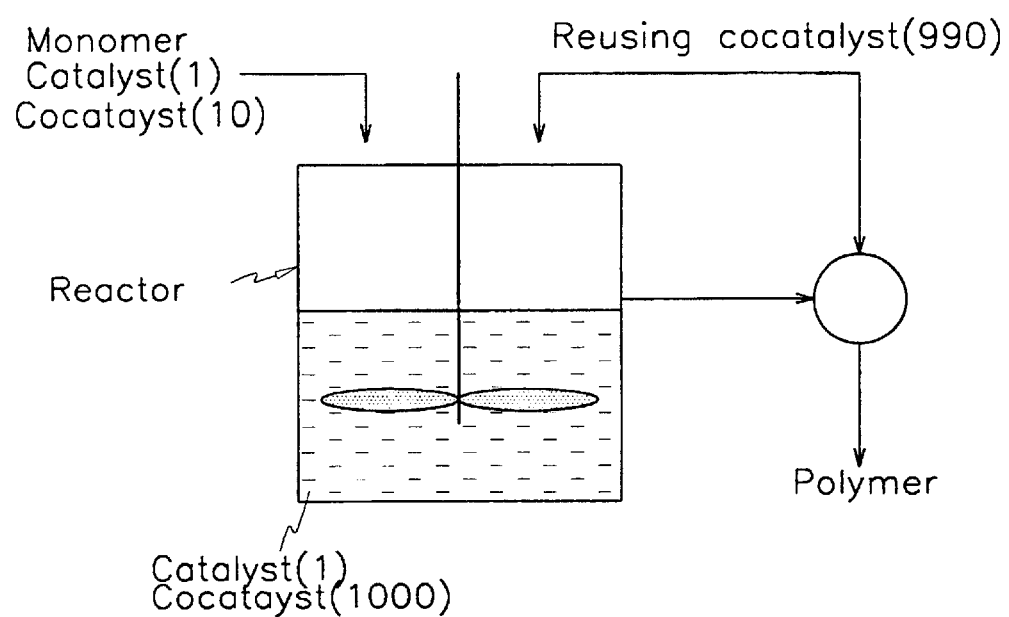
FIG. 1 is a diagram showing a method of recycling a cocatalyst according to the present invention.

The present invention provides a method of recycling a cocatalyst for olefin polymerization. The method of the present invention may be used in slurry polymerization.

In the method, olefinic monomers are polymerized by using a supported catalyst and a cocatalyst. The supported catalyst is prepared by covalent-bonding a catalyst with a support. The cocatalyst is dissolved in a suspension. The cocatalyst is separated from the suspension after polymerization, and the separated cocatalyst is reused for subsequent polymerization.

For recycling the cocatalyst, it is necessary to use the supported metallocene catalyst which is not leached from the support by the heat generated during polymerization or the cocatalyst dissolved in suspension. The leached catalyst causes the morphology of polymer particles to be deteriorated and decreases in apparent density, thereby reducing the amount of polymer is produced and causing difficult separation of the polymer from the suspension. Furthermore, the polymer produced by the leached catalyst sticks on the reactor wall and results in fouling, which makes the heat removal difficult.

In the present invention, for solving these problems, the supported catalyst is covalent-bonded with the support. Methods of preparing the supported catalyst are as follows:

In one method, a cyclopentadienyl ligand is covalent-bonded on the surface of silica and the metallation is done with the ligand (K. Soga, H. J. Kim, and T. Shino, Makromol. Rapid Commun. 15. 139 (1994); Japanese Patent No. Hei 6-56928 and U.S. Pat. No. 5,466,766).

In another method, a metallocene compound including a ligand with a functional group having high activity (e.g., an alkoxysilane group) to silica is synthesized first and then the metallocene compound reacts with the surface OH group of silica. That is, the metallocene compound is directly bonded on the silica (R. Jackson, J, Ruddlesden, D. J. Thompson, and R. Whelan, J. Organomet. Chem. 125 (1977), 57; B. L. Booth, G. C. Ofunne, C. Stacey, and P. J. T. Tait, J. Organomet. Chem. 315 (1986), 145; European Patent No. 293815).

In still another method, a metallocene catalyst having alkoxy silane group reacts with a silica. The silica has a surface siloxane group with high activity by drying at a temperature above 600° C. The metallocene catalyst is prepared by substituting a hydrogen radical in $R^3$, $R^4$ and B of a compound of Formula 2 or a compound of Formula 3 with at least one radical of Formula 1.

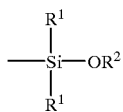
[Formula 1]

where $R^1$ is selected from the group consisting of a hydrogen radical, an alkyl radical, an arylalkyl radical, an alkylaryl radical, an aryl radical, of 1 to 20 carbon atoms, a halogen radical, and an alkoxy radical of 1 to 20 carbon atoms; and $R^2$ is selected from the group consisting of an alkyl radical, an arylalkyl radical, an alkylaryl radical, and an aryl radical, of 1 to 20 carbon atoms.

$$(C_5R^3{}_m)_pB_s(C_5R^3{}_m)MQ_{3-p}$$ [Formula 2]

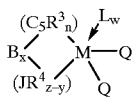
[Formula 3]

where M is a transition metal of Group IVB of the Periodic Table;

$(C_5R^3{}_m)$ or $(C_5R^3{}_n)$ is a cyclopentadienyl or substituted cyclopentadienyl, each $R^3$ which can be the same or different, is a hydrogen radical, an alky radical, an arylalkyl radical, an alkylaryl radical, an aryl radical, of 1 to 20 carbon atoms, a halogen radical, and an alkoxy radical of 1 to 20 carbon atoms, or a metalloid radical of metal of Group 14 (Ivb in the previous IUPAC form) substituted with hydrocarbyl group, a cyclopentadienyl or substituted cyclopentadienyl ligand in which two adjacent carbon atoms are joined together to form one or more $C_4$–$C_8$ rings by a hydrocarbyl radical;

B is a bridge joining two cyclopentadienyl ligands or a cyclopentadienyl ligand and $JR^4{}_{z-y}$ by a covalent bond, which is selected from the group of consisting of an alkylene radical of 1 to 4 carbon atoms, a dialkylsilicone radical, a dialkylgermanium radical, an alkyl phosphine radical, or an amine radical;

$R^4$ is selected from the group of consisting of a hydrogen radical, an alkyl radical, an alkenyl radical, an arylalkyl radical, an alkylaryl radical, an aryl radical, of 1 to 20 carbon atoms;

J is an element of Groups VA or VIA of the Periodic Table;

Q is the same or different halogen radical, an alkyl radical, an alkenyl radical, an arylalkyl radical, an alkylaryl radical, an aryl radical, or alkylidene radical, of 1 to 20 carbon atoms;

L is a Lewis base and w is greater than 0;

s is 0 or 1, p is 0, 1 or 2, when p is 0, s is 0, when s is 1, m is 4, and when s is 0, m is 5;

z is a valence number of J, and is 3 for element of Group VA, and 2 for Group VIA; and x is 0 or 1, when x is 0, n is 5, y is 1, when x is 1, n is 4, y is 2.

The present invention may use the supported catalyst synthesized by any of the three methods, preferably by the third method in that a metallocene catalyst having alkoxy silane group reacts with the silica, because few side reaction occurs and the amount of leached catalyst is minimized in this method.

In still another method, the cocatalyst which is soluble in a suspension should be used. The suspension may be an aliphatic hydrocarbon solvent, such as hexane, isobutane, or heptane, an aromatic hydrocarbon solvent, or a hydrocarbon solvent with chlorine atom, such as dichloromethane or chlorobenzene. It is preferable to use hexane, heptane or isobutane. The cocatalyst of the present invention can be expressed by the Formula 4. The compound of Formula 4 only or a mixture of compounds of Formula 4 and Formula 5 may be used as a cocatalyst.

$$-[Al(R^5)-O]_a-$$ [Formula 4]

where $R^5$ is same or different and each selected from the group consisting of a halogen radical, hydrocarbyl radical of 1 to 20 carbon atoms and halogen-substituted hydrocarbyl radical of 1 to 20 carbon atoms; a is an integer greater than or equal to 2, and the compound is a linear, cyclic or networking compound.

Examples of the compound of Formula 4 are methylaluminoxane, ethylaluminoxane, isobutylaluminoxane or butylaluminoxane. Generally, methylaluminoxane has high activity to the metallocene catalyst. The methylaluminoxane is soluble in the aromatic hydrocarbon solvent such as toluene, but it is not soluble enough in the aliphatic hydrocarbon solvent. In other words, if the aliphatic hydrocarbon diluent is used for the suspension, it is difficult to use methylaluminoxane directly. To use all types of aluminoxane in the aliphatic hydrocarbon diluent, some methyl groups in the aluminoxane should be substituted with higher alkyl groups.

$$Al(R^5)_3$$ [Formula 5]

where $R^5$ is the same as in Formula 4 and three $R^5$ are the same or different.

Examples of the compound of Formula 5 include trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminum methoxide and dimethylaluminum ethyoxide. Trimethylaluminum, triethylaluminum and triisobutylaluminum are preferred.

The olefinic monomer which can be polymerized by the present invention includes ethylene, alpha-olefin, cyclic olefin, diene olefinic monomers having two double bonds, and triene. Examples include ethylene, propylene, 1-butene, 1-pentene, 4-methyl-1-pentene, 1-hexene, 1-heptene, 1-decene, 1-undecene, 1-dodecene, 1-tetradecene, 1-hexanedecene, 1-iococene, norbornen, norbornadiene, ethylidennorbornen, vinyinorbornen, dicyclodpentadiene, 1,4-butadiene, 1,5-pentadiene, 1,6-hexadiene, styrene, alpha-methylstyrene, 3-chloromethylstyrene and the mixture thereof.

The method of recycling cocatalyst of the present invention is illustrated lo in the accompanying drawing. In FIG. 1, a monomer, a catalyst and a cocatalyst are injected into a reactor and reacted in the reactor, thereby obtaining a polymer. The numbers in FIG. 1 indicates an example of the ratios of the monomer and the catalyst at each step. If the cocatalyst amount required in the reactor is 1000 and the catalyst amount is 1, the reused amount of the is cocatalyst is 990 and the newly added amount thereof is 10. Therefore, the method of the present invention can reduce the amount of the cocatalyst that is used. That is, since the cocatalyst can be reused for subsequent olefin polymerization process, the amount of the total cocatalyst required can be reduced. Furthermore, the obtained polymer includes a small amount of the cocatalyst and has an excellent quality.

The following examples illustrate the preparation methods of a homogeneous and a supported catalyst for olefin polymerization and a polymerization method of olefin using the supported catalyst. Although the present invention has been described with reference to preferred examples, it is to be understood that the invention is not limited to the preferred examples as herein described.

Organic reagents and solvents were purchased from Aldrich company and Merck company and purified using standard techniques before use. Ethylene having a high degree of purity was obtained from Applied Gas Technology company, and was passed through a water and oxygen removing filter before use. The cocatalyst used was MMAO-3 dissolved in heptane purchased from Akzo company. All the steps of catalyst synthesis, supporting and polymerization, were performed under the air and moisture-free conditions. The structure of the catalyst was confirmed by dissolving it in $CDCl_3$ and analyzing the resulting solution with a 270 MHz Jeol Nuclear Magnetic Resonance (NMR) or 300 MHz Bruker NMR. For determining the amount of the catalyst in the support, a Zr amount was determined using an ICP (Inductively Coupled Plasma) method.

EXAMPLE 1 a) Synthesis of $[CH_2=CH(CH_2)_8C_5H_4]_2ZrCl_2$ 11.1 g of 9-decene-1-ol, 15.6 g of paratoluenesulfonylchloride and 150 ml of diethylether were injected into a 200 ml one-neck flask and mixed well. The flask was placed in a cooling bath kept at about $-10°$ C. and the temperature was reduced. 36.8 g of fine powder potassium hydroxide was slowly added to the mixture at the reduced temperature for 10 minutes. The resulting mixture was shaken for 30 minutes at $-15$ to $-5°$ C. Thereafter, the resulting product was added to 200 ml of ice water. At this time, an organic layer, an ether layer, and a water layer were separated. The ether layer was collected with a separatory funnel and dried over magnesium sulfuric anhydride.

The resulting ether layer was filtered and decanted magnesium sulfate. The layer was placed in a 200 ml schlenk flask and ether was removed from the resulting layer with a suction rotating distillator, thereby obtaining a transparent viscose compound. 160 ml of anhydride tetrahydrofuran was injected into the schienk flask containing the compound with a syringe. The schlenk flask was taken from the cooling bath and shaken for 3 to 5 hours at the room temperature.

The resulting solution in the schlenk flask was transferred to a 1 L separatory funnel, and 200 ml of water and 200 ml of hexane were injected into the separatory funnel. After shaking, an organic layer was collected, dried over magnesium sulfuric anhydride and filtered. Thereafter, the solvent was vaporized with a suction rotating distillator. As a result, a slightly yellow compound in the form of a solution was obtained. The compound was vacuum distilled at 0.1 torr and at a temperature of about 100 ° C., thereby producing 10 g of a pure compound (yield 69%) of 1-decenylcyclopentadiene.

10.0 g of the 1-decenylcyclopentadiene obtained according to the above procedure and 80 ml of anhydride tetrahydrofuran (THF) were injected into a 250 ml schienk flask. The schienk flask was placed in a cooling bath containing acetone-dry ice and the temperature was reduced to $-78°$ C. While shaking, 19.6 ml of N-butyl lithium (2.5 M hexane solution) was injected into the flask with a syringe. The temperature was slowly elevated to the room temperature and the flask was shaken at the room temperature over night. The resulting product was mixed with a toluene solution including $ZrCl_4(THF)_2$ using the method described in Inorganic Synthesis 1982, vol 21, page 135. The mixture was shaken for 3 days at 50 to $60°$ C. Using a vacuum pump, hexane was removed from the resulting mixture, thereby obtaining a white compound (9.74 g, yield 70%) of $[CH_2=CH_9CH_2]_8C_5H_4]_2ZrCl_2$.

NMR (270 MHz, $CDCl_3$): 6.29 (2H, t, J=2.43 Hz), 6.20 (2H, t, J=2.43 Hz), 5.9–5.7(1H, m), 5.05–4.85(2H, m), 2.62 (2H, t, J=7.56 Hz), 2.10–1.95 (2H, m), 1.6–1.2 (12H, M).

b) Synthesis of $[Cl(Me)_2Si-9CH_2]_{10}C_5H_4]2ZrCl_2$ 1.328 g of $[CH_2=CH_9CH_2]_8C_5H_4]_2ZrCl_2$ obtained in step a) was weighed in a dry box and injected into a 100 ml schlenk flask. The compound was taken from the dry box and 5 ml of toluene was added to the compound. While shaking, 1.0 ml of chlorodimethylsilane was added to the mixture. 20 ml (0.1 M) of $H_2PtCl_6$, isopropanol solution was added to the mixture and the resulting mixture was shaken for a day at the room temperature. The solvent was removed by a vacuum pump and 100 ml of hexane was added to the resulting material. The resulting mixture was then heated to dissolve the product. Thereafter, the heated product was filtered and the filtered solution was placed in a refrigerator for a day, thereby obtaining a white crystal (yield 90%) of $[Cl(Me)_2Si-(CH_2)_{10}C_5H_4]_2ZrCl_2$.

NMR (270 MHz, $CDCl_3$); 6.27 (2H, t, J=2.97 Hz), 6.17 (2H. t, J=2.97 Hz), 2.60 (2H, t. J=7.83 Hz), 1.7–1.1 16 H, m), 0.75–0.85 (2H, m), 0.39 (6H, s)

c) Synthesis of $[(EtO)(Me)_2Si-(CH_2)_{10}C_5H4]_2ZrCl_2$ 2.2 ml of triethylorthoformate was added to 0.983 g of $[Cl(Me)_2Si-(CH_2)_{10}C_5H_4]_2ZrCl_2$ obtained in step b), and the resulting mixture was mixed well. About 1 mg of $AlCl_3$ was added to the mixture such that gas was generated and the reaction was started. After 2 hours no more gas was generated. Using a vacuum pump, volatile materials were removed from the resulting mixture, thereby obtaining a solid oil compound (0.903 g, yield 89%) of $[(EtO)(Me)_2Si-(CH_2)_{10}C_5H_4]_2ZrCl_2$.

NMR (300 MHz, $CDCl_3$): 6.27 (2H, t, J=2.64 Hz), 6.18 (2H, t, J=2.43 Hz), 3.63 (2H, q, J=7.3 Hz), 2.60 (2H, t. J=7.5 Hz)m 1.6–1.2 (16H, m), 1.16 (3H, t, J=7.3 Hz), 0.59–0.53 (2H, m), 0.06 (6H, s).

d) Preparation of a supported catalyst 2.0 g of Davision. Grace 948 silica was weighed and placed in a quartz bath. The bath was placed in a furnace manufactured by Lindberg company and the temperature was increased to $800°$ C. at a rate of $7°$ C. a minute. At this temperature, the mixture was dried under a vacuum and pressurized for 21 hours. Thereafter, the furnace was turned off to lower the temperature of the mixture to room temperature. The dried silica was transferred from a dry box to a schlenk flask. The schlenk flask was sealed and 20 ml of hexane was added to the silica in the schlenk flask, thereby obtaining a silica suspension.

210 mg of $[(EtO)(Me)_2Si-(CH_2)_{10}C_5H_4]_2ZrCl_2$ as a catalyst was dissolved in 10 ml of hexane and the solution was added to the silica suspension. The mixture was refluxed for 18 hours. As a result, a supported catalyst where the catalyst was covalently bonded with the silica support was obtained. The supported catalyst was then filtered for two days by using a soxhlet extractor and a toluene solvent, thereby removing the unreacted material which does not covalently bind with the silica support. The amount of Zr in the supported catalyst was measured and it was determined that 0.10 mmol/g of Zr was in the supported catalyst.

e) Recycle of a cocatalyst 100 mg of the supported catalyst was weighed in a dry box and placed in a glass bath. These steps were performed four times to produce four glass bathes. The four glass baths were sealed and taken from the dry box. 200 ml of the purified hexane was added to a first reactor and 2.0 ml of MMAO-3 (6.6% Al) was added to the first reactor. The mixture was shaken for 5 minutes in an incubator kept at 80° C. and 40 psig of pressure of ethylene was applied to the first reactor. Thereafter, polymerization was performed for 1 hour. The layer including the produced polymer and the hexane layer including an excess of the cocatalyst was separated. The temperature of the first reactor was reduced to room temperature.

The hexane layer was transferred into a second reactor by using a kanuller under an air-free state. Polymerization was performed under the same conditions and by the same method as in the first reactor. The hexane layer was transferred from the second reactor to the third reactor.

A monomer was polymerized in a fourth reactor by using hexane and the cocatalyst derived from the first reactor. After polymerizing, a polymer was dried in an oven at 80° C. The entire amount of hexane injected into the first reactor could not be transferred into the fourth reactor because the separated polymer layer included a similar amount of hexane. At each step of transferring from one reactor to another reactor, the amount of the decreased hexane was 40 ml. The amounts of the remaining hexane and the produced polymer are shown in Table 1.

TABLE 1

|  | First reactor | Second reactor | Third reactor | Fourth reactor |
|---|---|---|---|---|
| Remaining amounts of hexane [ml] | 200 | 160 | 120 | 80 |
| Amounts of the produced polymer [g] | 8.6 | 7.5 | 6.4 | 5.4 |

According to the method of the present invention, the suspension including an excess of the cocatalyst can be reused after polymerization. Therefore, in the present invention, since the cocatalyst can be reused for subsequent olefin polymerization, the total amount of the cocatalyst required can be reduced.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of recycling a cocatalyst for olefin polymerization conducted with a metallocene catalyst, the method comprising:
polymerizing olefinic monomers in the presence of a supported catalyst and a cocatalyst, the supported catalyst being a metallocene catalyst covalent-bonded with a support, and the cocatalyst being dissolved in a suspension;
separating the cocatalyst from the resulting suspension; and
reusing the separated cocatalyst for subsequent olefin polymerization.

2. The method of claim 1, wherein the supported catalyst is prepared by contacting a silica with a metallocene compound, the silica having siloxane groups with high activity on the surface thereof by drying a silica at a temperature above 600° C. and the compound being prepared by substituting a hydrogen radical in $R^3$, $R^4$ and B of a compound of Formula 2 or a compound of Formula 3 with at least one radical of Formula 1:

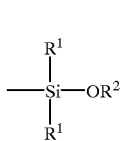

[Formula 1]

where $R^1$ is selected from the group consisting of a hydrogen radical, an alkyl radical, an arylalkyl radical, an alkylaryl radical, an aryl radical, of 1 to 20 carbon atoms, a halogen radical, and an alkoxy radical of 1 to 20 carbon atoms; and $R^2$ is selected from the group consisting of an alkyl radical, an arylalkyl radical, an alkylaryl radical, and an aryl radical, of 1 to 20 carbon atoms;

$$(C_5R^3{}_m)_pB_s(C_5R^3{}_m)MQ_{3-p}$$ [Formula 2]

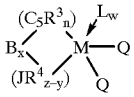

[Formula 3]

where M is a transition metal of Group IVB of the Periodic Table;

$(C_5R^3{}_m)$ or $(C_5R^3{}_n)$ is a cyclopentadienyl or substituted cyclopentadienyl, each $R^3$ which can be the same or different, is a hydrogen radical, an alky radical, an arylalkyl radical, an alkylaryl radical, an aryl radical, of 1 to 20 carbon atoms, a halogen radical, and an alkoxy radical of 1 to 20 carbon atoms, or a metalloid radical of metal of Group 14 (Ivb in the previous IUPAC form) substituted with hydrocarbyl group, a cyclopentadienyl or substituted cyclopentadienyl ligand in which two adjacent carbon atoms are joined together to form one or more $C_4$–$C_8$ rings by a hydrocarbyl radical;

B is a bridge joining two cyclopentadienyl ligands or a cyclopentadienyl ligand and $JR^4{}_{z-y}$ by a covalent bond, which is selected from the group of consisting of an alkylene radical of 1 to 4 carbon atoms, a dialkylsilicone radical, a dialkylgermanium radical, an alkyl phosphine radical, or an amine radical;

$R^4$ is selected from the group of consisting of a hydrogen radical, an alkyl radical, an alkenyl radical, an arylalkyl radical, an alkylaryl radical, an aryl radical, of 1 to 20 carbon atoms;

J is an element of Groups VA or VIA of the Periodic Table;

Q is the same or different halogen radical, an alkyl radical, an alkenyl radical, an arylalkyl radical, an alkylaryl radical, an aryl radical, or alkylidene radical, of 1 to 20 carbon atoms;

L is a Lewis base and w is greater than 0;

s is 0 or 1, p is 0, 1 or 2, when p is 0, s is 0, when s is 1, m is 4, and when s is 0, m is 5;

z is a valence number of J, and is 3 for element of Group VA, and 2 for Group VIA; and x is 0 or 1, when x is 0, n is 5, y is 1, when x is 1, n is 4, y is 2.

3. The method of claim 2 wherein the supported catalyst includes a compound of Formula 2

$$(C_5R^3{}_m)_p B_s (C_5R^3{}_m) MQ_{3-p} \qquad \text{[Formula 2]}$$

where M is a transition metal of Group IVB of the Periodic Table;

$(C_5R^3{}_m)$ or $(C_5R^3{}_n)$ is a cyclopentadienyl or substituted cyclopentadienyl, each $R^3$ which can be the same or different, is a hydrogen radical, an alkyl radical, an arylalkyl radical, an alkylaryl radical, an aryl radical, of 1 to 20 carbon atoms, a halogen radical, and an alkoxy radical of 1 to 20 carbon atoms, or a metalloid radical of metal of Group 14 (Ivb in the previous IUPAC form) substituted with hydrocarbyl group, a cyclopentadienyl or substituted cyclopentadienyl ligand in which two adjacent carbon atoms are joined together to form one or more $C_4$–$C_8$ rings by a hydrocarbyl radical;

B is a bridge joining two cyclopentadienyl ligands by a covalent bond, which is selected from the group of consisting of an alkylene radical of 1 to 4 carbon atoms, a dialkylsilicone radical, a dialkylgermanium radical, an alkyl phosphine radical, or an amine radical; and s is 0 or 1, p is 0, 1 or 2, when p is 0, s is 0, when s is 1, m is 4, and when s is 0, m is 5.

4. The method of claim 3 wherein s is 0, p is 1, Q is a chlorine radical, $R^1$ is a methyl radical and $R^2$ is a methyl radical or an ethyl radical.

5. The method of claim 1, wherein the cocatalyst is a linear, cyclic or network compound of Formula 4:

$$-[Al(R^5)-O]_a- \qquad \text{[Formula 4]}$$

where $R^5$ is same or different and each selected from the group consisting of a halogen radical, hydrocarbyl radical of 1 to 20 carbon atoms and halogen-substituted hydrocarbyl radical of 1 to 20 carbon atoms; a is an integer greater than or equal to 2.

6. The method of claim 5 wherein the cocatalyst includes a linear, cyclic or network compound of Formula 4 and a compound of Formula 5

$$-[Al(R^5)-O]_a- \qquad \text{[Formula 4]}$$
$$Al(R^5)_3 \qquad \text{[Formula 5]}$$

where $R^5$ is same or different and each selected from the group consisting of a halogen radical, hydrocarbyl radical of 1 to 20 carbon atoms and halogen-substituted hydrocarbyl radical of 1 to 20 carbon atoms; a is an integer greater than or equal to 2.

7. The method of claim 5 wherein $R^5$ is methyl or isobutyl in the compound of Formula 4.

8. The method of claim 1, wherein the suspension comprises a diluent.

9. The method of claim 8, wherein the diluent of the suspension is hexane, heptane, or isobutane.

10. The method of claim 8, wherein the separation of the cocatalyst comprises separating a layer comprising the cocatalyst from the resulting suspension.

11. The method of claim 10, wherein the layer further comprises at least part of the diluent.

12. The method of claim 10, wherein the reuse of the separated cocatalyst comprises using the separated layer in the subsequent olefin polymerization.

13. The method of claim 1, wherein in the subsequent olefin polymerization an extra amount of the cocatalyst is added in addition to the reuse of the separated cocatalyst.

* * * * *